Nov. 13, 1956        D. E. CROOKER        2,770,013
STUD HOLDERS FOR USE IN TIRE MOLDS
Filed Feb. 28, 1951
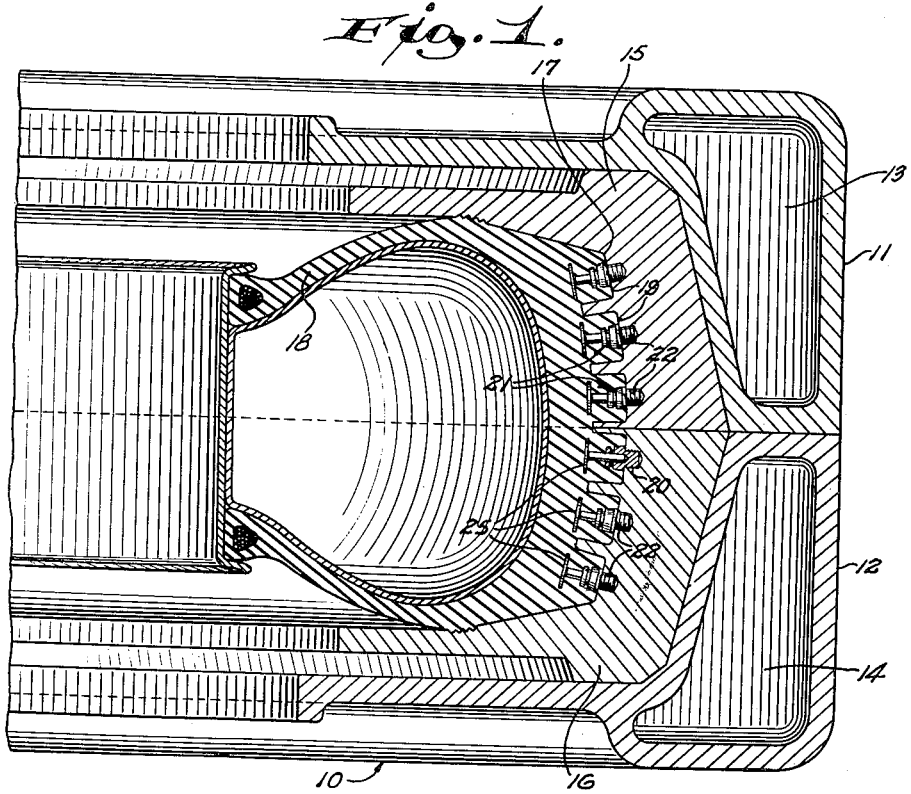
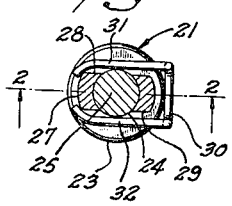
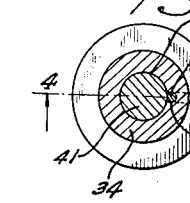
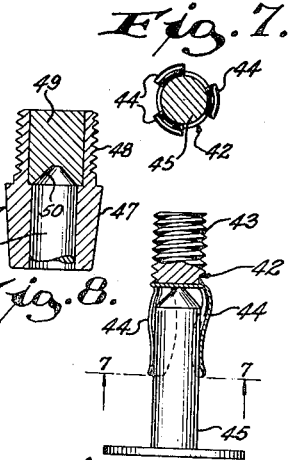
INVENTOR.
David E. Crooker
BY
Munsell & Munsell
ATTORNEYS.

United States Patent Office 2,770,013
Patented Nov. 13, 1956

2,770,013

STUD HOLDERS FOR USE IN TIRE MOLDS

David E. Crooker, Ontonagon, Mich., assignor of one-half to Lloyd L. Felker, Marshfield, Wis.

Application February 28, 1951, Serial No. 213,140

7 Claims. (Cl. 18—36)

This invention relates to improvements in stud holders for use in tire molds.

The present invention is designed for use in the manufacture of an improved tire construction wherein the tread surface of the tire is formed with a plurality of recesses, and wherein a metal stud or quill is embedded in the tread of the tire with the shank portion thereof projecting outwardly and disposed within each of said recesses. This tire construction has been found to have particular merit in a wide variety of applications, but until now no convenient and satisfactory means has been available for holding the studs in proper position during a tire molding or retreading operation.

With the above in mind, it is a general object of the invention to provide an improved tire mold provided with holding devices which are adapted to hold traction enhancing studs in position during a tire molding operation, said studs being readily removable from the holders when the finished tire is being taken out of the mold and the holding action of said holders not being sufficiently strong to pull the studs from the finished tire as the tire is removed from the mold.

A further object of the invention is to provide an improved stud holder for tire molds, said holder not only serving as a positioning means, but also being shaped to form a recess in the portion of the tire tread which surrounds the outer end portion of the stud held thereby.

A further object of the invention is to provide, as one form of the invention, an improved stud holder for tire molds wherein there is spring means for frictionally holding the stud.

A further object of the invention is to provide an improved stud holder for tire molds wherein in another form of the invention there is a magnet for removably holding the metallic stud in position.

A further object of the invention is to provide an improved stud holder which is simple in construction, and which can be incorporated either in conventional new tire molds or in recapping molds.

With the above and other objects in view, the invention consists of the improved stud holder and all of its parts and combinations, as set forth in the claims, and all equivalents thereof.

In the drawing accompanying and forming a part of this specification wherein are shown several forms of the invention and wherein like characters of reference indicate the same parts in all of the views:

Fig. 1 is a fragmentary transverse sectional view taken through a mold equipped with the improved stud holders, there being a tire in position in the mold;

Fig. 2 is a side elevational view, on an enlarged scale and partly in section, showing one form of stud holder wherein there is a spring clip;

Fig. 3 is a transverse sectional view taken along the line 3—3 of Fig. 2;

Fig. 4 is a view similar to Fig. 2 showing a modified form of stud holder having a longitudinally extending wire clip;

Fig. 5 is a transverse sectional view taken along the line 5—5 of Fig. 4;

Fig. 6 is a view similar to Figs. 2 and 4 showing a modified form of the invention wherein there are leaf type spring members for holding a stud;

Fig. 7 is a transverse sectional view taken along the lines 7—7 of Fig. 6; and

Fig. 8 is a longitudinal sectional view taken through a modified form of stud holder wherein there is a permanent magnet for releasably retaining the metallic stud.

Referring more particularly to Fig. 1 of the drawing, the numeral 10 indicates a tire mold formed of two complementary sections 11 and 12 which sections may be formed with steam jackets 13 and 14 respectively. Within the mold section 11 is a matrix section 15, and within the mold section 12 is a complementary matrix section 16.

The mold matrix sections 15 and 16 are formed with elongated depressions 17 which may take the form of rider strip forming grooves, as illustrated, or they may be in proper form for any other tread pattern. The depressions 17 may have flat bottom surfaces 19 which form flat road engaging surfaces on the tread of a tire 18 which is being formed in the mold 10.

The flat bottom surfaces 19 of the depressions 17 are formed with threaded recesses 20, each adapted to receive the threaded end 22 of a stud holder 21. Any other means may be employed for anchoring the holders in the matrix. Referring to Figs. 2 and 3, the stud holder 21 comprises a tapered sleeve portion 23 having an open end and having a closed end, the threaded portion 22 being formed on the closed end and coaxial with the sleeve portion 23. The sleeve portion 23 is preferably formed with a cylindrical bore 24 which is adapted to removably receive the shank of a stud or quill 25, the latter being preferably formed at its opposite end with a flat head 26 of relatively large diameter. The sleeve portion 23 is also formed with an external circumferential groove 27, and, as shown in Fig. 3, this groove is deepened into communication with opposite side wall portions of the bore 24, as at 28 and 29, to expose portions of the sides of the shank of the stud 25.

A generally U-shaped wire clip 30 is formed with arm portions 31 and 32 which are positionable in the groove 27 and in the portions 28 and 29 of the groove, said arms being frictionally engageable with the sidewalls of the stud 25. The tips of the arms 31 and 32 may be bent toward one another, as shown. Outwardly of the sleeve 23 the closed U-shaped end of the clip 30 is preferably bent toward the threaded portion 22 of the holder 21, as shown in Fig. 2. If desired, the length of the arms 31 and 32 of the clip 30 may be shortened, as shown in Fig. 1, so that no portion of the clip 30 projects outwardly of the groove 27 and so that there is no upwardly bent U-shaped portion as there is in Figs. 2 and 3.

In use of the improved mold, prior to the placement of the tire 18 therein, the studs 25 are placed in the sleeve portions of the stud holders 21 in the manner shown in Figs. 1 and 3. When the studs are inserted into the holders 21, the spring clips 30 frictionally engage opposite side wall portions thereof and hold the studs in the holders. A tire 18, having an uncured tread portion, is then placed between the mold matrix sections 16 and 17 in the usual manner, and upon inflation of the tire, the uncured tread rubber flows into the depressions 17 and around the holders 21 and studs 25.

The heat from the steam jackets 13 and 14 cures the uncured rubber of the tire tread and, as a result, the rubber permanently assumes the tread pattern imparted thereto by the matrix. At the same time the studs 25 become permanently embedded in the tread portion of the tire 18, and the holders 21 form recesses or sockets in the road-engaging surface of the tread portion, said recesses surrounding and being concentric with the outer ends of the studs 25.

Upon the completion of the curing operation, deflation of the tire 18 withdraws the tread portion of the tire from the depressions 17 of the matrix and the studs 25 are simultaneously withdrawn from the holders 21. The frictional engagement of the clips 30 with the studs 25 is not sufficiently strong to prevent withdrawal of the studs from the holders as the tire is deflated. The frictional contact of the clips 30 is, however, sufficient to retain the studs 25 in their holders prior to and during the curing operation.

While the invention has been shown and described in connection with a sectional mold, it is obvious that it is equally applicable to the "curing ring" type of mold.

Figs. 4 and 5 show a modified form of stud holder 33 having a sleeve portion 34 similar to the sleeve portion 23 and having a threaded opposite end portion 35 similar to the threaded portion 22 of the holder 21. The sleeve portion 34 is formed with a bore 36, and said bore is formed with a longitudinally extending groove 37 extending inwardly from the open end thereof. An aperture 38 extends transversely outwardly from the inner end of the groove 37, as shown in Fig. 4, and a wire clip 39 of generally U-shape has an L-shaped elongated arm 40 positioned in the groove 37 and in the aperture 38, as shown. The diameter of the arm 40 is such that it frictionally engages a side portion of the stud 41 when the latter is positioned in the bore 36 as shown in Fig. 4.

Figs. 6 and 7 show another form of stud holder 42 wherein there is a threaded end portion 43 from which leaf spring elements 44, preferably three in number, project. The elements 44 are arcuate in transverse cross-section and generally S-shaped in longitudinal cross-section, as shown. They extend axially of the threaded portion 43 and are preferably equally spaced circumferentially, as well as about the axis of the threaded portion. As shown in Fig. 6, the spring elements 44 are adapted to receive and removably hold therebetween the shank of a stud 45.

Fig. 8 shows a desirable form of stud holder 46 having the same general shape as the holder 33 of Fig. 4. The holder 46 has a tapered sleeve portion 47 and an integral coaxial threaded sleeve portion 48. The bore of the sleeve portion 47 communicates with and has a slightly smaller diameter than the bore of the sleeve portion 48, and positioned within the latter bore is a cylindrical permanent magnet 49 having a conical recess 50 formed in its inner end face. In use, the shank of a metallic stud 51 is inserted into the open end of the sleeve portion 47 until the tip thereof engages the magnet 49. The stud 51, being made of magnetic material, is releasably held in position within the sleeve 47 by the magnetic attraction of the magnet 49.

Various changes and modifications may be made without departing from the spirit of the invention, and all of such changes are contemplated, as may come within the scope of the claims.

What I claim is:

1. In a tire mold, a circular matrix having an internal peripheral portion adapted to form a road engaging surface on a tire, said portion having a plurality of threaded holes therein, a plurality of stud holders each having a portion removably threaded within one of said holes and each stud holder having another portion projecting inwardly from said internal peripheral portion of the matrix, said last-mentioned portion of each holder being bored to a substantial depth to provide an elongated open ended socket for receiving a portion of the length of the shank of a stud with the remaining portion projecting freely, and means in connection with said socket constituting the sole means for normally releasably retaining said shank therein and for retaining the projecting portion in rigid projecting position, said socket including means for determining the amount of the length of the shank which is received in said socket.

2. In a tire mold, a circular matrix having an internal peripheral portion adapted to form a road engaging surface on a tire, said portion having a plurality of holes therein, a plurality of stud holders each having a bored attaching portion fixed within one of said holes and each stud holder having another portion projecting inwardly from said internal peripheral portion of the matrix, said last-mentioned portion of each holder being bored to a substantial depth to provide an elongated open ended socket for receiving the shank of a stud with the remaining portion projecting freely, and a permanent magnet positioned in the bore of the attaching portion of each stud holder, said magnet constituting the sole holding means and so located as to normally releasably retain a predetermined portion of the length of the shank of a stud in the open ended socket and retain the projecting portion of said shank in rigid projecting position.

3. In a tire mold a circular matrix having an internal peripheral portion adapted to form a road engaging surface on a tire, a plurality of stud holders on said peripheral portion each comprising: a sleeve member having a socket of substantial depth provided with an open end, said sleeve member being connected at its opposite end to said matrix, and magnetic means in the bottom of said socket at said last mentioned end of said sleeve forming the sole holding means for a stud and positioned at such a distance from the open end of the sleeve as to normally releasably retain a predetermined portion of the length of the shank of a stud therein with another portion retained rigidly in projecting position, said magnetic means having strength which is insufficient to interfere with the withdrawal of the stud from the holder after the molding of a tire with the stud anchored therein has been completed.

4. In a tire mold a circular matrix having an internal peripheral portion adapted to form a road engaging surface on a tire, a plurality of stud holders on said peripheral portion each comprising: a sleeve member having a socket of substantial depth provided with an open end, said sleeve member being connected at its opposite end to said matrix, and a permanent magnet having a pole forming a bottom for said socket at said last mentioned end of said sleeve forming the sole holding means for a stud, and said bottom being positioned at such a distance from the open end as to normally releasably retain a predetermined portion of the length of the shank of a stud therein with another portion retained rigidly in projecting position, said permanent magnet having strength which is insufficient to interfere with the withdrawal of the stud from the holder after the molding of a tire with the stud anchored therein has been completed.

5. In a tire mold a circular matrix having an internal peripheral portion adapted to form a road engaging surface on a tire, a plurality of stud holders on said peripheral portion each comprising: a sleeve member having a socket of substantial depth provided with an open end, said sleeve member being connected at its opposite end to said matrix and said opposite end having a bore, and a solid cylindrical permanent magnet positioned in the bore at said last mentioned end of said sleeve forming the sole holding means for a stud and located to normally releasably retain a predetermined portion of the length of the shank of a stud in the socket with another portion retained rigidly in projecting position, said permanent magnet having strength which is insufficient to interfere with the withdrawal of the stud from the holder after the molding of a tire with the stud anchored therein has been completed.

6. In a tire mold a circular matrix having an internal peripheral portion adapted to form a road engaging surface on a tire, a plurality of stud holders on said peripheral portion each comprising: a sleeve member having a socket of substantial depth provided with an open end, said sleeve member being connected at its opposite end to said matrix and said opposite end having a bore communicating with said socket, and a solid cylindrical permanent magnet positioned in said bore forming the sole holding means for a stud and having an end so located in the bottom of the socket as to releasably retain a predetermined portion of the length of the shank of a stud in said socket with another portion retained rigidly in projecting position, said permanent magnet having strength which is insufficient to interfere with the withdrawal of the stud from the holder after the molding of a tire with the stud anchored therein has been completed.

7. In a tire mold a circular matrix having an internal peripheral portion adapted to form a road engaging surface on a tire, a plurality of stud holders on said peripheral portion each comprising a sleeve member having a socket of substantial depth provided with an open end, said sleeve member being connected at its opposite end to said matrix and said opposite end having a bore communicating with said socket, there being an annular shoulder between said bore and socket, and a solid cylindrical permanent magnet positioned in and fitting said bore and having an end abutting said annular shoulder at the bottom of the socket and furnishing the sole holding means for a stud, said end being positioned at such a distance from the open end of the socket as to normally releasably retain a predetermined portion of the length of the shank of a stud in said socket with another portion retained rigidly in projecting position, said permanent magnet having strength which is insufficient to interfere with the withdrawal of the stud from the holder after the molding of a tire with the stud anchored therein has been completed.

References Cited in the file of this patent
UNITED STATES PATENTS

| | | |
|---|---|---|
| 660,444 | Kribs | Oct. 23, 1900 |
| 966,784 | Anderson | Aug. 9, 1910 |
| 1,622,077 | Batterman | Mar. 22, 1927 |
| 2,121,956 | Eger | June 28, 1938 |
| 2,345,371 | Amrine | Mar. 28, 1944 |
| 2,465,276 | Ryder | Mar. 22, 1949 |
| 2,540,045 | Crooker | Jan. 30, 1951 |
| 2,550,775 | Clark | May 1, 1951 |
| 2,556,225 | Serge | June 12, 1951 |
| 2,561,247 | Throm | July 17, 1951 |
| 2,666,470 | Kimes | Jan. 19, 1954 |